Nov. 11, 1924.  
W. LAWRENCE  
1,514,667  
VALVE AND OPERATING MEANS THEREFOR  
Filed July 11, 1921
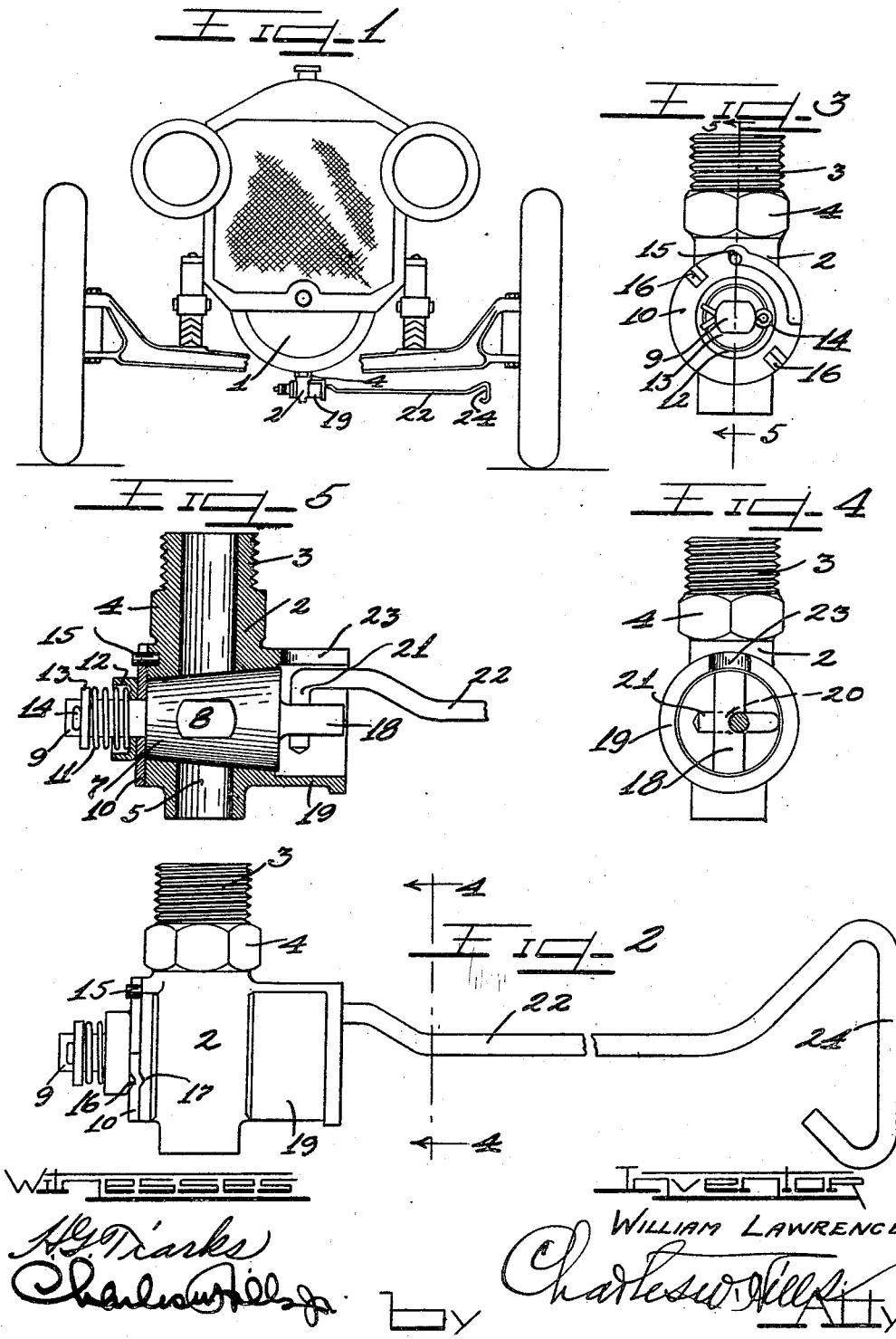

Patented Nov. 11, 1924.

1,514,667

UNITED STATES PATENT OFFICE.

WILLIAM LAWRENCE, OF CHICAGO, ILLINOIS.

VALVE AND OPERATING MEANS THEREFOR.

Application filed July 11, 1921. Serial No. 483,722.

*To all whom it may concern:*

Be it known that I, WILLIAM LAWRENCE, a citizen of the United States, and a resident of the city of Chicago, in the county of Cook and State of Illinois, have invented certain new and useful Improvements in a Valve and Operating Means Therefor; and I do hereby declare that the following is a full, clear, and exact description of the same, reference being had to the accompanying drawings, and to the numerals of reference marked thereon, which form a part of this specification.

This invention relates to a valve and operating means therefor, and particularly to a valve which may be conveniently operated to drain lubricants from the crank case of a motor vehicle engine and from other relatively inaccessible places.

In order that an internal combustion engine may operate efficiently, it is necessary that the lubricant in the crank case be changed at intervals, and since it is necessary to drain the crank case from its lowest point, the drain valves or outlet plugs used for this purpose are difficult to reach and require that the person changing the lubricant do the work from an awkward and uncomfortable position.

Another difficulty which exists with many drain valves in use at the present time is that they are liable to be left open or to be opened accidentally, thus causing a loss of oil from the crank case and consequent damage to the engine.

It is an object of the present invention to obviate these difficulties by the provision of an improved drain valve which may be conveniently operated from an easily accessible position.

It is another object of this invention to provide a drain valve which is locked against accidental opening.

It is an important object of this invention to provide a valve having removable means whereby it may be operated from a distance, said means being locked to the valve at all times except when it is in closed position.

Other and further important objects of this invention will be apparent from the disclosures in the specification and the drawings.

The invention (in a preferred form) is shown on the drawings and hereinafter more fully described.

On the drawings:

Figure 1 is a front elevation of an automobile equipped with the improved drain valve of this invention, showing the operating means in position for use.

Figure 2 is a side elevation of the drain valve showing the operating means therein.

Figure 3 is an end elevation of the drain valve.

Figure 4 is a section on the line 4—4 of Figure 2.

Figure 5 is a section on the line 5—5 of Figure 3, showing the operating means broken away and in elevation.

As shown on the drawings:

The drain valve of this invention is adapted to be threaded in an aperture which is ordinarily provided at the lowest point in the crank case 1 of a motor vehicle engine, and the main body of said drain valve ordinarily comprises a casing 2 which is provided with a threaded portion 3 adapted to be engaged in said threaded aperture. In order that the casing 2 may be conveniently rotated to screw the threaded portion 3 into the aperture, a hexagonal portion 4 is formed thereon which may be conveniently engaged by a wrench or other suitable tool. The casing 2 is provided with a lubricant passage 5 extending longitudinally thereof, and said casing also has a tapered passage cored therein transversely of the passage 5 and adapted to receive a tapered plug 7 rotatably mounted therein and adapted to control the flow of liquid through said passage 5 in the usual manner, said plug 7 being provided with an opening 8 therethrough which is adapted to be brought into register with the passage 5 by rotating the plug. The small end of said plug 7 is provided with a flattened extension 9 which extends outwardly from the casing 2 and which has engaged thereon a disk or plate 10 which is rotatable therewith and which is held against the end of the plug 7 and against a flattened portion of the casing 2 by means of a helical spring 11 which is engaged on the flattened portion 9 between the washers 12 and 13, the outer washer 13 of which is secured in position by means of a cotter key 14 engaged through an aperture in said flattened portion 9.

A portion of the plate 10 is cut away as shown in Figures 2, 3 and 5 to allow movement of the plate relative to a pin 15 which projects outwardly from the casing 2 and which restricts this relative movement of the plate to the amount of said cut away portion, which is sufficient to allow the plug 7 to be rotated into the proper position to open and close the passage 5. Said plate 10 is also formed inwardly to afford projections 16 which are adapted to engage in notches 17 formed in the flattened portion of the casing and thus lock the plug 7 in adjusted closed position.

On the end opposite the flattened portion 9, the plug 7 is provided with an integral flattened portion 18 which extends outwardly nearly to the end of a cylindrical housing 19 which is integral with and projects outwardly from the sides of the casing 2. Said flattened portion 18 is provided with a central aperture 20 which is adapted to receive a transverse portion 21 of an operating rod 22 which is engaged therein through a slot or opening 23 formed in the upper side of the housing 19 to open or close the passage 5. The width of the flattened portion 18 is only slightly less than the internal diameter of the cylindrical member 19, and the operating member 22 is so formed that the transverse portion 21 thereon can only be inserted in the aperture 20 or removed therefrom when the valve is closed, that is, when the plug 7 is rotated to close the passage 5. In cases where the drain valve of this invention is used with motor vehicle engines, the operating member 22 is made of sufficient length to extend outwardly to the side of the vehicle chassis, as shown in Figure 1, and the outer end thereof is provided with a suitable handle 24 whereby said operating member may be rotated and the valve opened or closed without the necessity of the operator crawling under the car or working in an uncomfortable position.

The operation is as follows:

The operation of the improved drain valve of this invention is very simple, it only being necessary to insert the transverse portion 21 on the operating member 22 through the opening 23 in the housing 19, after which the plug 7 may be rotated to open the passage 5 through the casing 2. Reverse rotation of the operating member acts to close the passage 5 and when said passage 5 is closed the operating member is again in such position that it may be withdrawn through the slot or cutaway portion 23. This construction insures the closing of the valve before the operating member is removed and consequently there is no danger of the valve being accidentally left open.

Since the flattened portion 18 is nearly entirely enclosed by the housing 19, there is little danger of the valve being accidentally opened due to said portion 18 accidentally coming into contact with weeds, sticks or other foreign objects, and the locking plate 10 affords additional means for maintaining the valve in closed position.

It will be apparent that this invention provides an improved drain valve which may be conveniently operated even when placed in comparatively inaccessible positions, which is necessarily closed before the operating member is removed, and which is provided with improved means whereby it is locked in such closed position.

The device is particularly valuable for use in connection with motor vehicles, since it affords means whereby the lubricant may be conveniently drained from the crank case without the necessity of getting under the vehicle and with a minimum of effort on the part of the operator.

I am aware that numerous details of construction may be varied through a wide range without departing from the principles of this invention, and I therefore do not purpose limiting the patent granted otherwise than necessitated by the prior art.

I claim as my invention:

1. A valve and operating means therefor, comprising an apertured valve head, a housing surrounding said head and having a single longitudinal slot therein, and a removable handle adapted to be inserted through said slot and into the aperture in said head only when the valve is in closed position and to be rotated within said housing to open said valve.

2. A valve and operating means therefor, comprising a valve head having a transverse aperture therein, a housing surrounding said head and having a single longitudinal slot therein, and a removable handle having a bent end adapted to be inserted laterally through said slot and into the aperture in said head only when the valve is in closed position and to be rotated within said housing to open said valve.

In testimony whereof I have hereunto subscribed my name in the presence of two subscribing witnesses:

WILLIAM LAWRENCE.

Witnesses:
CARLTON HILL.
OSCAR HARTMANN.